US006746122B2

(12) United States Patent
Knox

(10) Patent No.: US 6,746,122 B2
(45) Date of Patent: *Jun. 8, 2004

(54) IMAGE PROJECTION SYSTEM ENGINE ASSEMBLY

(75) Inventor: Richard M. Knox, Houston, TX (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/120,845

(22) Filed: Apr. 12, 2002

(65) Prior Publication Data

US 2002/0159034 A1 Oct. 31, 2002

Related U.S. Application Data

(63) Continuation of application No. 08/730,818, filed on Oct. 17, 1996, now Pat. No. 6,390,626.

(51) Int. Cl.$^7$ .............................................. G03B 21/14
(52) U.S. Cl. ............................ 353/20; 353/31; 353/84; 349/9
(58) Field of Search ............................ 353/20, 31, 33, 353/34, 37, 84, 98; 349/8, 9, 5; 348/742, 743

(56) References Cited

U.S. PATENT DOCUMENTS

| 3,652,163 A | 3/1972 | Borkowski et al. |
| 4,425,028 A | 1/1984 | Gagnon et al. |
| 4,526,442 A | 7/1985 | Betensky et al. |
| 4,544,237 A | 10/1985 | Gagnon |
| 4,799,137 A | 1/1989 | Aho ........................... 362/309 |
| 4,874,228 A | 10/1989 | Aho et al. ................... 350/345 |
| 4,961,642 A | 10/1990 | Ogino |
| 4,969,732 A | 11/1990 | Wright et al. |
| 5,054,885 A | 10/1991 | Melby ......................... 359/618 |
| 5,083,857 A | 1/1992 | Hornbeck ................... 359/291 |

(List continued on next page.)

FOREIGN PATENT DOCUMENTS

| EP | 0463816 A2 | 1/1992 |
| EP | 0 488 590 A1 | 6/1992 |
| EP | 0783133 A1 | 7/1997 |
| FR | 2673006 | 2/1992 |
| JP | 61013885 | 1/1986 |
| JP | 03063690 | 3/1991 |
| JP | 033187696 | 8/1991 |
| JP | 3-243932 | 10/1991 |
| WO | WO 96/37806 | 11/1996 |
| WO | WO 97/10490 | 3/1997 |

OTHER PUBLICATIONS

"Chapter 8—Liquid Crystal Displays," pp. 181–251.

Primary Examiner—William C. Dowing
(74) Attorney, Agent, or Firm—Fleshner & Kim LLP

(57) ABSTRACT

A light projection engine uses a wide angle reflecting polarizer material (preferably 3M DBEF brand double brightness enhancement filter) as a polarizing beamsplitter to direct polarized light to beam splitter/combiner (such as an X-cube dichroic reflector). The beam splitter/combiner then splits the directed polarized light into separate reflective LCD panels acting as light valves. The LCD panels alter the polarity of the incident light from 0 degrees up to 90 degrees to control which light is passes from the wide angle reflecting polarizer back towards the light source and which light has the necessary polarization change to allow it to pass from the wide angle reflecting polarizer to the lens system. After reflecting off of the LCD panels, the light goes back through the X-cube dichroic reflector, where it is recombined. The recombined light which is of a first polarity is transmitted from the reflecting polarizer to the lens system, while the recombined light which is of a second polarity is transmitted to the light source. The LCDs are preferably analog polarizing LCDs.

40 Claims, 10 Drawing Sheets

U.S. PATENT DOCUMENTS

| | | | |
|---|---|---|---|
| 5,122,905 A | 6/1992 | Wheatley et al. | 359/586 |
| 5,122,906 A | 6/1992 | Wheatley | 359/586 |
| 5,130,850 A | 7/1992 | Toide | |
| 5,148,157 A | 9/1992 | Florence | 340/783 |
| 5,190,370 A | 3/1993 | Miller et al. | 362/340 |
| 5,193,015 A | 3/1993 | Shanks | |
| 5,218,480 A | 6/1993 | Moskovich | |
| 5,223,869 A | 6/1993 | Yanagi | |
| 5,225,823 A | 7/1993 | Kanaly | 340/793 |
| 5,233,385 A | 8/1993 | Sampsell | 355/35 |
| 5,237,641 A | 8/1993 | Jacobson et al. | |
| 5,243,459 A | 9/1993 | Winston et al. | |
| RE34,492 E | 12/1993 | Roberts | |
| 5,289,312 A | 2/1994 | Hashimoto et al. | |
| 5,303,322 A | 4/1994 | Winston et al. | |
| 5,313,479 A | 5/1994 | Florence | 372/26 |
| 5,323,414 A | 6/1994 | Baird et al. | |
| 5,333,072 A | 7/1994 | Willett | |
| 5,337,106 A | 8/1994 | Jutamulia et al. | |
| 5,371,628 A | 12/1994 | Shimoda et al. | |
| 5,381,309 A | 1/1995 | Borchardt | 362/31 |
| 5,384,607 A | 1/1995 | Morris et al. | |
| 5,389,982 A | 2/1995 | Lee | 353/20 |
| 5,404,076 A | 4/1995 | Dolan et al. | 313/572 |
| 5,404,171 A | 4/1995 | Golstein et al. | 348/459 |
| 5,416,618 A | 5/1995 | Juday | 359/53 |
| 5,424,869 A | 6/1995 | Nanjo | |
| 5,453,859 A * | 9/1995 | Sannohe et al. | 349/9 |
| 5,463,433 A | 10/1995 | Koo | 353/84 |
| 5,467,146 A | 11/1995 | Huang et al. | 348/743 |
| 5,467,154 A | 11/1995 | Gale et al. | 353/119 |
| 5,486,949 A | 1/1996 | Schrenk et al. | 359/498 |
| 5,504,391 A | 4/1996 | Turner et al. | 313/570 |
| 5,508,841 A | 4/1996 | Lin et al. | 359/318 |
| 5,517,340 A | 5/1996 | Doany et al. | 359/41 |
| 5,523,881 A | 6/1996 | Florence et al. | 359/561 |
| 5,528,720 A | 6/1996 | Winston et al. | |
| 5,539,579 A | 7/1996 | Miyatake et al. | |
| 5,552,938 A | 9/1996 | Sugawara | |
| 5,555,324 A | 9/1996 | Waxman et al. | 382/254 |
| 5,557,343 A | 9/1996 | Yamagishi | |
| 5,573,324 A | 11/1996 | Devaan | 353/77 |
| 5,594,591 A | 1/1997 | Winston | |
| 5,594,830 A | 1/1997 | Yamamoto et al. | |
| 5,597,222 A | 1/1997 | Doany et al. | |
| 5,604,607 A | 2/1997 | Mirzaoff | |
| 5,606,220 A | 2/1997 | Dolan et al. | 313/637 |
| 5,610,768 A | 3/1997 | Winston | |
| 5,612,820 A | 3/1997 | Schrenk et al. | 359/498 |
| 5,621,486 A | 4/1997 | Doany et al. | 353/34 |
| 5,626,800 A | 5/1997 | Williams et al. | 264/1.38 |
| 5,642,129 A | 6/1997 | Zavracky et al. | 345/100 |
| 5,653,520 A | 8/1997 | Kato | |
| 5,670,842 A | 9/1997 | Dolan et al. | 313/570 |
| 5,682,080 A | 10/1997 | Dolan et al. | 313/570 |
| 5,686,793 A | 11/1997 | Turner et al. | 313/570 |
| 5,692,820 A | 12/1997 | Gale et al. | 353/77 |
| 5,706,063 A | 1/1998 | Hong | 349/9 |
| 5,738,426 A | 4/1998 | Daujogo et al. | 353/20 |
| 5,800,032 A | 9/1998 | Uchiyama et al. | |
| 5,805,326 A | 9/1998 | Snow et al. | |
| 5,833,360 A | 11/1998 | Knox et al. | 362/293 |
| 5,867,239 A | 2/1999 | Sahouani et al. | 349/117 |
| 5,868,480 A | 2/1999 | Zeinali | 353/31 |
| 5,890,786 A | 4/1999 | Kurematsu | 353/20 |
| 5,900,987 A | 5/1999 | Kreitzer | |
| 5,912,762 A * | 6/1999 | Li et al. | 359/352 |
| 5,932,116 A | 8/1999 | Mercer et al. | |
| 5,940,149 A | 8/1999 | Vanderwerf | 349/5 |
| 5,949,589 A | 9/1999 | Nakazawa | |
| 5,969,874 A | 10/1999 | Moskovich | |
| 5,975,703 A * | 11/1999 | Holman et al. | 353/20 |
| 6,005,332 A | 12/1999 | Mercer | |
| 6,172,813 B1 | 1/2001 | Tadic-Galeb et al. | 359/618 |
| 6,181,386 B1 | 1/2001 | Knox | 348/788 |
| 6,200,713 B1 | 3/2001 | Iadic-Galeb | 353/77 |
| 6,390,626 B2 * | 5/2002 | Knox | 353/20 |

\* cited by examiner

IMAGE PROJECTION SYSTEM ENGINE ASSEMBLY

This application is a Continuation of application Ser. No. 08/730,818 filed Oct. 17, 1996 now U.S. Pat. No. 6,390,626.

BACKGROUND OF THE INVENTION

1. Field of the Invention

The present invention relates to image projection engines. More particularly, the present invention relates to an image projection engine that provides a polarized image for use in, for instance, a "folded" projection system.

2. Description of the Related Art

High power lamps are used for illumination applications beyond typical incandescent and fluorescent lamps. One type of lamp known as a high intensity discharge (HID) lamp consists of a glass envelope which contains electrodes and a fill which vaporizes and becomes a plasma when the lamp is operated.

Recently, a patent issued for a high power lamp that utilizes a lamp fill containing sulfur or selenium or compounds of these substances. U.S. Pat. No. 5,404,076, issued to Dolan et al. and entitled "Lamp Including Sulfur" discloses an electrodeless lamp utilizing a fill at a pressure at least as high as one atmosphere. The fill is excited at a power density in excess of 50 watts per square centimeter. A lamp utilizing the fill is excited at a power density of at least 60 watts per square centimeter. The Dolan et al. patent is incorporated herein by reference Other pressures and power densities can be employed.

Projecting systems are used to display images on large surfaces, such as movie or television screens and computer displays. For example, in a front projection system, an image beam is projected from an image source onto the front side of a reflection-type angle transforming screen, which then reflects the light toward a viewer positioned in front of the screen. In a rear projection system, the image beam is projected onto the rear side of a transmission-type angle transforming screen and transmitted toward a viewer located in front of the screen.

Projection engine designs are not new. For example, in U.S. Pat. No. 5,453,859 (hereby incorporated by reference), a system is shown that uses a polarization beam splitter along with a dichroic "X-cube" to create a color image. Referring to FIG. 14 of that patent, it is seen that polarized light from a light source 91 is reflected by a polarization beam splitter to a dichroic prism 95. The reflected light is S-polarized, or polarized normal to the plane of incidence within the prism 93. This S-polarized light is then passed through a quarter wave plate 94, which circularly polarizes that S-polarized light. For each pixel that is in the "off" position, that circularly polarized light is reflected unchanged by the corresponding pixel of a reflective LCD 96, 97, and 98. Then, that circularly polarized light is restored to its original S-polarized state on the return path through the quarter wave plate 94. That light is then reflected back towards the light source by the prism 93.

For pixels that are to be lit, the LCDs 96, 97, and 98 convert some of the circularly polarized light to elliptically polarized light. When this light is passed through the quarter wave plate 94, the light passed will not be solely S-polarized, but will instead include a P-polarized component, which is passed through the prism 93, through a projection lens 99, and into whatever projection system is used.

Displaytech, Inc., in a 6-page technical disclosure entitled "FLC/VLSI Display Technology" and dated Dec. 1, 1995; Parfenov et al., in "Advanced optical schemes with liquid crystal image converters for display applications," SPIE Proceedings, Volume 2650, pages 173–179 (Jan. 29–31, 1996); and Baur et al., in "High performance liquid crystal device suitable for projection display," SPIE Proceedings, Volume 2650, pages 226–228 (Jan. 29–31, 1996), disclose background information on the use of liquid crystal devices to process video images. These papers are hereby incorporated by reference.

SUMMARY OF THE INVENTION

The present invention provides an improved projection engine. Polarized light from a light source is reflected by a polarizer/analyzer (such as a 3M DBEF material) which reflects only the S-polarized components of light and transmits P-polarized components of light.

One of the polarized components of light is passed to an image engine that forms an image by shifting the polarity of portions of the light. For example, the S-polarized light can be passed to a dichroic X-cube beam splitter/combiner (or other beam splitter/combiner for splitting the S-polarized light into red, green, and blue components when light passes through the beam splitter/combiner in a first direction and for combining red, green, and blue components when light passes through the beam splitter/combiner in a second direction) which provides red, green, and blue light to spatial light modulator type liquid crystal displays. Alternatively, the beam splitter/combiner could be omitted and a color sequential technique could instead be used to provide colored light. In addition, a combination of the two techniques can be employed. The liquid crystal displays alter the polarity of the S-polarized light so that the reflected light is S-polarized, P-polarized, or elliptically polarized with both S-polarized and P-polarized components, depending on the amount of light that is to be transmitted to the display and the type of spatial light modulator. This light, if the polarity is unchanged, is reflected back to the light source by the polarizer/analyzer. Any P-polarized components, however, are passed through the polarizer/analyzer and on to the display.

Using this system, a variable intensity of each color can be applied with each pixel, and each resulting pixel is generated through the coaligned colors of light. Further, the optics are highly efficient, because virtually all of the source light of an "on" pixel is transmitted for display and virtually all of the source light of an "off" pixel is returned to the lamp where its energy may be recovered.

The beam splitter/combiner is chosen such that there is either no alteration of the polarity of light passing therethrough (the preferred situation) or a consistent, predictable alteration of the polarity so that compensation for the alteration of polarity can be made by controlling the LCDs. For example, if a beam splitter/combiner that is chosen for use alters the polarity of green light passing back and forth through it one quarter wave total, the LCDs for the green light would be adjusted such that if one wanted a dark pixel, one would cause the LCD to alter the polarity back one quarter wave in the opposite direction to end up with a green light beam that is reflected back at the source from the DBEF reflective surface.

The present invention preferably comprises a projection display apparatus comprising:

a source of rays of polarized light;

a 3M DBEF reflecting polarizer aligned at an angle to the rays of polarized light for passing substantially all of the rays of polarized light which are polarized in a first direction and for reflecting substantially all of the rays of polarized light which are polarized in a second direction;

a beam splitter/combiner, having a first, primary incidence plane aligned with the reflected polarized light for splitting the rays of polarized light which are polarized in the second direction into blue, green, and red light rays;

a first reflecting polarizing LCD for receiving the blue light rays from the beam splitter/combiner, shifting the polarization of none, some, or all of the blue light rays, and directing the blue light rays back into the beam splitter/combiner;

a second reflecting polarizing LCD for receiving the green light rays from the beam splitter/combiner, shifting the polarization of none, some, or all of the green light rays, and directing the green light rays back into the beam splitter/combiner;

a third reflecting polarizing LCD for receiving the red light rays from the beam splitter/combiner, shifing the polarization of none, some, or all of the red light rays, and directing the red light rays back into the beam splitter/combiner; and a lens for receiving and transmitting substantially all of the rays of polarized light which are polarized in the first direction and which have passed from the beam splitter/combiner through the DBEF reflecting polarizer.

Preferably, the source of rays of polarized light comprises a "light-pumped" source that can re-absorb and re-emit unused reflected light; when a "light-pumped" source is used, the apparatus can also include a mirror aligned at substantially a 90° angle to the rays of polarized light as the rays exit the source for reflecting back to the source the rays of polarized light which are polarized in a first direction and which pass through the DBEF reflecting polarizer without first passing through the beam splitter/combiner. The source of rays of polarized light preferably includes a reflecting polarizing filter for passing substantially all of the rays of polarized light which are polarized in the second direction and for reflecting substantially all of the other rays of light. The source of rays of polarized light preferably also comprises a reflecting filter for passing substantially all rays of blue light, green light, and red light, and for reflecting substantially all rays of light which are not blue light, green light, or red light.

A condenser lens can advantageously be interposed along the path of the rays of polarized light between the source of rays of polarized light and the DBEF polarizing reflector.

The source of rays of polarized light can advantageously comprise:

an electrodeless lamp body that defines a chamber;

a gas contained within the chamber;

electrodes positioned externally of the lamp chamber for producing radio frequency energy that excites the gas, forming a plasma light source of intense heat that emits a light beam, wherein the electrodes are not subjected to the intense heat generated at the plasma; and a reflector positioned next to the lamp body for redirecting some of the light emitted by the light source back to the lamp using the reflector so that the lamp reabsorbs light energy to intensify the light source, wherein the reflector includes a polarizing filter that is positioned to receive and polarize the light beam.

The projection display apparatus of the present invention can advantageously be used as an image source in a projection apparatus for producing an image display on a display surface comprising a display surface, an optical device which is reflective of some light and transmissive of other light; and means for transmitting light from the image source to the display surface such that the light travels an image path which reaches the optical device twice on its way to the display surface.

The present invention also comprises a method of producing a visual image comprising:

providing a source of rays of polarized light;

directing the rays of polarized light onto a 3M DBEF reflecting polarizer aligned at an angle to the rays of polarized light for passing substantially all of the rays of polarized light which are polarized in a first direction and for reflecting substantially all of the rays of polarized light which are polarized in a second direction;

reflecting the light rays which are aligned in the second direction from the 3M DBEF reflecting polarizer into a beam splitter/combiner having a first, primary incidence plane aligned at an angle to the 3M DBEF reflecting polarizer for splitting the rays of polarized light which are polarized in the second direction into blue, green, and red light rays;

valving the blue light rays in a first reflecting polarizing LCD for receiving the blue light rays from the beam splitter/combiner, by shifting the polarization of none, some, or all of the blue light rays 90°, and directing the blue light rays back into the beam splitter/combiner;

valving the green light rays in a second reflecting polarizing LCD for receiving the green light rays from the beam splitter/combiner, by shifting the polarization of none, some, or all of the green light rays 90°, and directing the green light rays back into the beam splitter/combiner;

valving the red light rays in a third reflecting polarizing LCD for receiving the red light rays from the beam splitter/combiner, by shifting the polarization of none, some, or all of the red light rays 90°, and directing the red light rays back into the beam splitter/combiner;

electrically controlling the LCDs;

reflecting the blue, green, and red light rays polarized in the second direction from the 3M DBEF reflecting polarizer back to the source of rays of polarized light; and transmitting the blue, green, and red light rays polarized in the first direction through the 3M DBEF reflecting polarizer to a lens which transmits the blue, green, and red light rays polarized in the first direction to produce a visual image. In this method, the source of rays of polarized light preferably comprises a "light-pumped" source that can re-absorb and re-emit unused reflected light. The method preferably further comprises the step of reflecting back to the source of rays of polarized light the rays of polarized light which are polarized in a first direction and which pass through the DBEF reflecting polarizer without first passing through the beam splitter/combiner from a mirror aligned at substantially a 90° angle to the rays of polarized light as the rays exit the source.

The source of rays of polarized light preferably includes a source of light and a reflecting polarizing filter for passing substantially all of the rays of polarized light which are polarized in the second direction and for reflecting substantially all of the other rays of light.

The source of rays of polarized light can also include reflecting filter for passing substantially all rays of blue light, green light, and red light, and for reflecting substantially all rays of light which are not blue light, green light, or red light.

In the method of the present invention, the LCDs are preferably analog LCDs.

The apparatus of the present invention can be broadly described as a projection display apparatus comprising:

an optically pumpable source of rays of polarized light that can re-emit unused light returned to it;

a wide angle reflecting polarizer for passing substantially all of the rays of polarized light which are polarized in a first direction and for reflecting substantially all of the rays of polarized light which are polarized in a second direction;

at least one reflecting polarizing LCD for receiving the light rays from the reflecting polarizer, shifting the polarization of none, some, or all of the light rays, and directing the light rays back towards the wide angle reflecting polarizer;

a lens for receiving and transmitting substantially all of the rays of polarized light whose polarization has been shifted by the at least one reflecting polarizing LCD; and means for returning the rays of polarized light whose polarization has not been shifted by the at least one reflecting polarizing LCD to the source of rays of polarized light to optically pump the source.

The method of the present invention can broadly be described as a method of producing a visual image comprising:

providing an optically pumpable source of rays of polarized light that can re-emit unused light returned to it;

directing the rays of polarized light onto a wide angle reflecting polarizer for passing substantially all of the rays of polarized light which are polarized in a first direction and for reflecting substantially all of the rays of polarized light which are polarized in a second direction;

using at least one reflecting polarizing LCD, shifting the polarization of none, some, or all of the light rays, and directing the light rays back towards the wide angle reflecting polarizer;

receiving with a lens and transmitting through the lens substantially all of the rays of polarized light whose polarization has been shifted by the at least one reflecting polarizing LCD; and returning the rays of polarized light whose polarization has not been shifted by the at least one reflecting polarizing LCD to the source of rays of polarized light to optically pump the source.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

U.S. application Ser. No. 08/581,108, filed Dec. 29, 1995, and entitled "Projecting Images," is hereby incorporated by reference.

Figure 1:
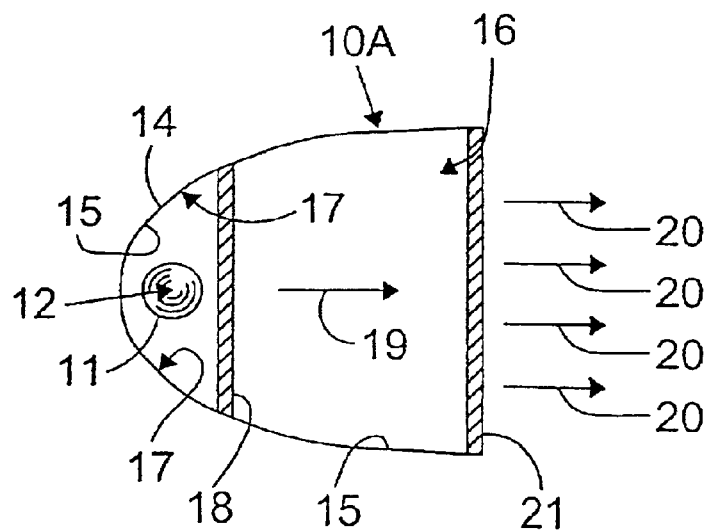
FIG. 1 is a sectional view of the preferred embodiment of the apparatus of the present invention.
Figure 1A:
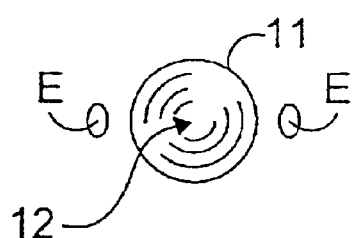
FIG. 1A is a fragmentary view of the preferred embodiment of FIG. 1.

Turning to the drawings, FIG. 1 shows generally an embodiment of the lamp apparatus of the present invention, designated generally by the numeral 10A, for use with the projector lamp optics assembly of the preferred embodiment of the present invention. A high efficiency lamp apparatus 10A includes a bulb 11 having a hollow interior 12 that contains a gas such as sulfur gas or selenium gas or some other lamp optimally capable of being optically pumped. The gas in bulb 11 can be excited to a plasma state so as to produce a high intensity light source. The gas fill is excited by electrodes E (see FIG. 1A), which provide radio frequency (or other appropriate frequency) energy to excite the fill; electrodes E are not subjected to the intense heat of the plasma inside bulb 11. Lamp apparatus 10A could also include a non-mercury containing metal halide lamp which works with fusion and is electrodeless. The fill may be high or low pressure.

Generally, redirecting light to a lamp will cause that lamp to fail. This is not true, however, with certain types of electrodeless lamps that can reabsorb such light. Such lamps include those shown in the Dolan patent, previously incorporated by reference, as well as certain lamps containing selenium gasses or non-mercury metal halide gasses. The advantage of using such lamps in the disclosed systems is that generally only certain colors or polarities of light are useable and needed in these systems. Therefore, with appropriate filtering (illustrated by FIGS. 1–8), only desired polarities or colors of light are passed, and the remainder is reflected back to the plasma formed in the electrodeless lamps for re-absorption and re-emission. This improves the efficiency of the light source.

A shaped (for instance, parabolic) annular reflector housing 14 is positioned about and spaced from bulb 11 as shown in FIG. 1. The housing 14 is hollow, defined by a wall 15 and an open end portion 16. The wall 15 has a reflecting surface 17. Housing 14 can be made of, for example, ceramic material.

A first transversely positioned screen 18 is interposed across the path of a light beam 19 that is travelling from the bulb 11 through the open end partition 16 in the direction of arrows 20. A second screen 21 is interposed across the path 19 and on the opposite side of screen 18 from bulb 11 as shown in FIG. 1.

The first screen 18 is preferably an interference filter (for example a dichroic filter or dichroic mirror), that reflects certain colors of light while allowing others to pass through. The screen 18 is preferably selected to pass red, green and blue light, reflecting undesired colors back to the bulb 11 and the reflector surface 17. By reflecting light other than desired colors back to the bulb 11, the lamp 10 becomes more efficient because it allows conversion of redirected light back to useful wavelengths. In FIG. 1, the lamp 10A has the screen 18 mounted inside the reflector housing 14 and the screen 21 mounted at opening 16. The screen 18 and the screen 21 each extends at its periphery to the wall 15.

The screen 21 is a reflecting polarizer that only allows a certain polarity of light to pass through as indicated by the arrows 20. The reflecting polarizer 21 reflects light of the wrong polarity back to the bulb 11. Therefore, in the lamp 10A, emitted light indicated as 20 has been filtered to be of a desired portion(s) of the color spectrum and of a desired polarity.

Figure 2:
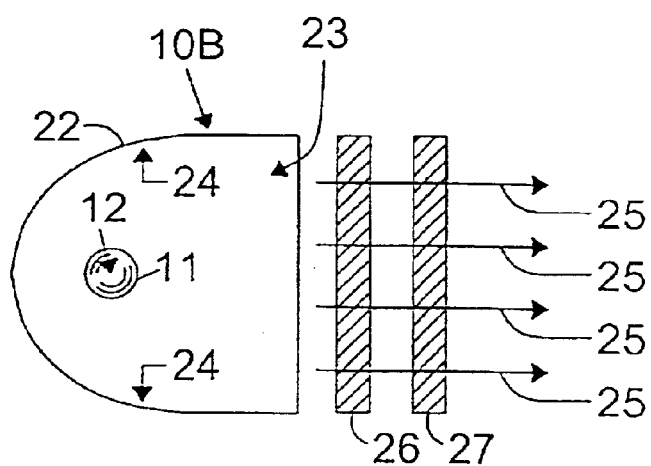
FIG. 2 is a sectional elevational view of a second embodiment of the apparatus of the present invention.
Figure 3:
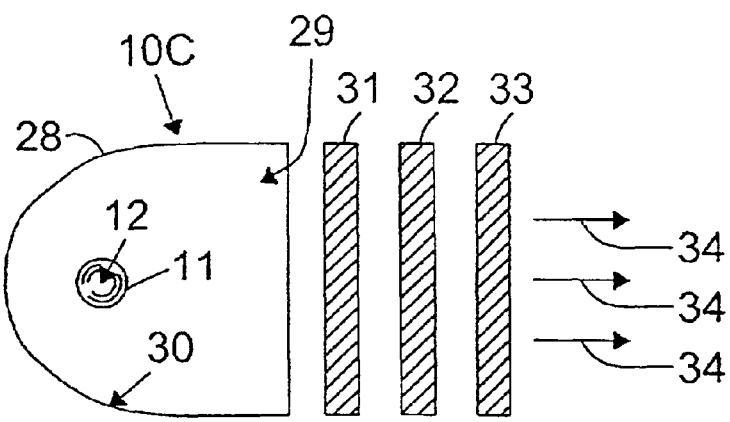
FIG. 3 is a sectional elevational view of a third embodiment of the apparatus of the present invention.
Figure 6:
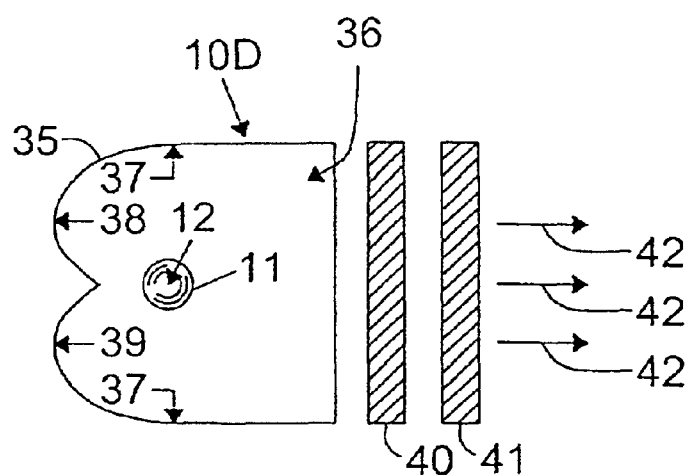
FIG. 6 is a sectional view of the sixth embodiment of the apparatus of the present invention.
Figure 7:
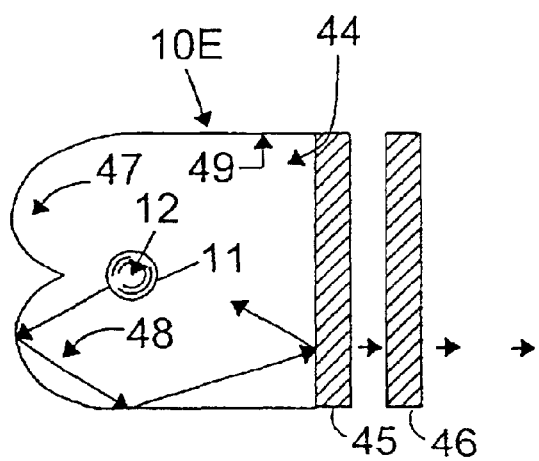
FIG. 7 is a sectional view of the seventh embodiment of the apparatus of the present invention.
Figure 4:
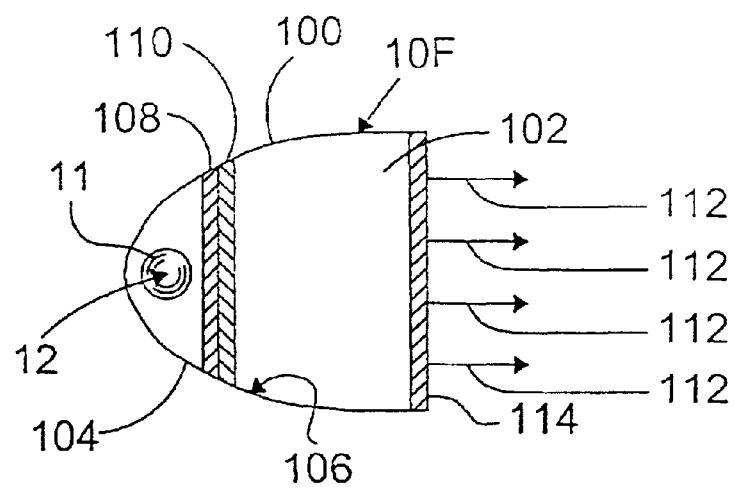
FIG. 4 is a sectional elevational view of a fourth embodiment of the apparatus of the present invention.
Figure 5:
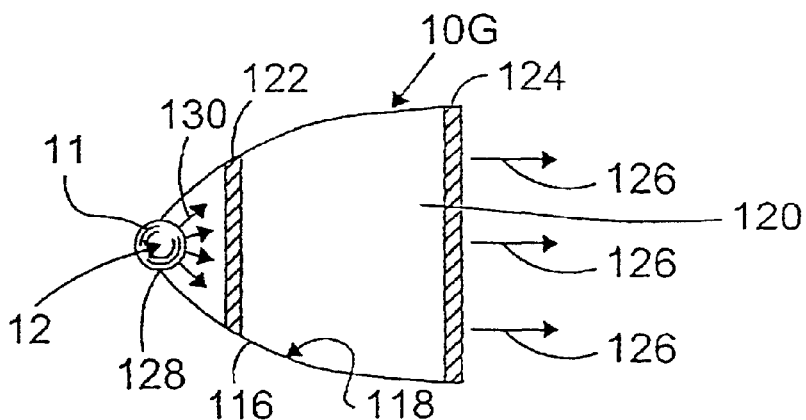
FIG. 5 is a sectional elevational view of a fifth embodiment of the apparatus of the present invention.
Figure 8:
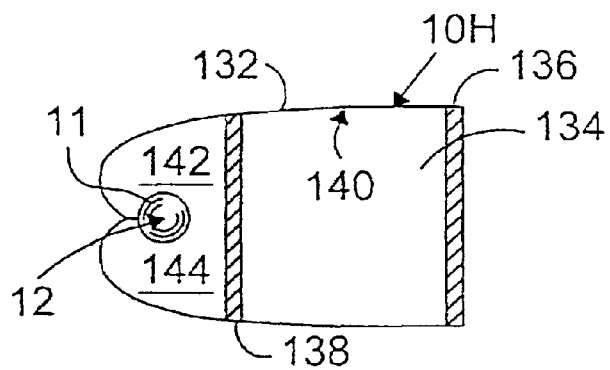
FIG. 8 is a sectional view of the eighth embodiment of the apparatus of the present invention.

In FIGS. 2–8, other embodiments of the lamp 10 are shown. FIG. 2 illustrates a lamp 10B similar to that of FIG. 1, with a pair of screens 26 and 27 positioned externally or covering an opening 23 of a reflector housing 22. The screen 26 is preferably an interference filter, and the screen 27 is preferably a reflecting polarizer. FIG. 3 illustrates an alternative lamp 10C, in which three optical elements 31, 32, and 33 are positioned external to a housing 28 and either away from or covering an open end portion 29 of the housing 28. The element 31 is preferably a reflecting polarizer, the element 32 is preferably an interference filter, and the element 33 is a clean-up absorbing filter. FIG. 4 illustrates another alternative lamp 10F, with an element 108 that is an interference filter and an element 110 that is a reflecting polarizer both mounted within a reflector housing 100, while an additional polarizing filter 114 covers an open end 102 of the reflector housing 100. FIG. 5 illustrates an alternative lamp 10G where a reflective housing 116 assumes a parabolic shape. FIG. 6 illustrates lamp 10D in which a reflector housing 35 has an inner reflecting surface 37 with double parabolic shapes and cross-sections. FIG. 7 illustrates an alternative lamp 10E, in which an opening 44 has an element 45 that is an interference filter, dichroic filter, or dichroic mirror, and an element 46, which is preferably a reflecting polarizer. FIG. 8 illustrates an alternative lamp 10H with dual parabolic reflectors that includes an internal element 138 that is preferably an interference filter and an element 136 covering an opening 134, where the element 136 is preferably a reflecting polarizer. All of these lamps 10 are intended to provide desired frequencies and polarities of light, while reflecting undesired light for re-absorption and re-emission by the fill within the bulb 11.

Figures 9, 10:
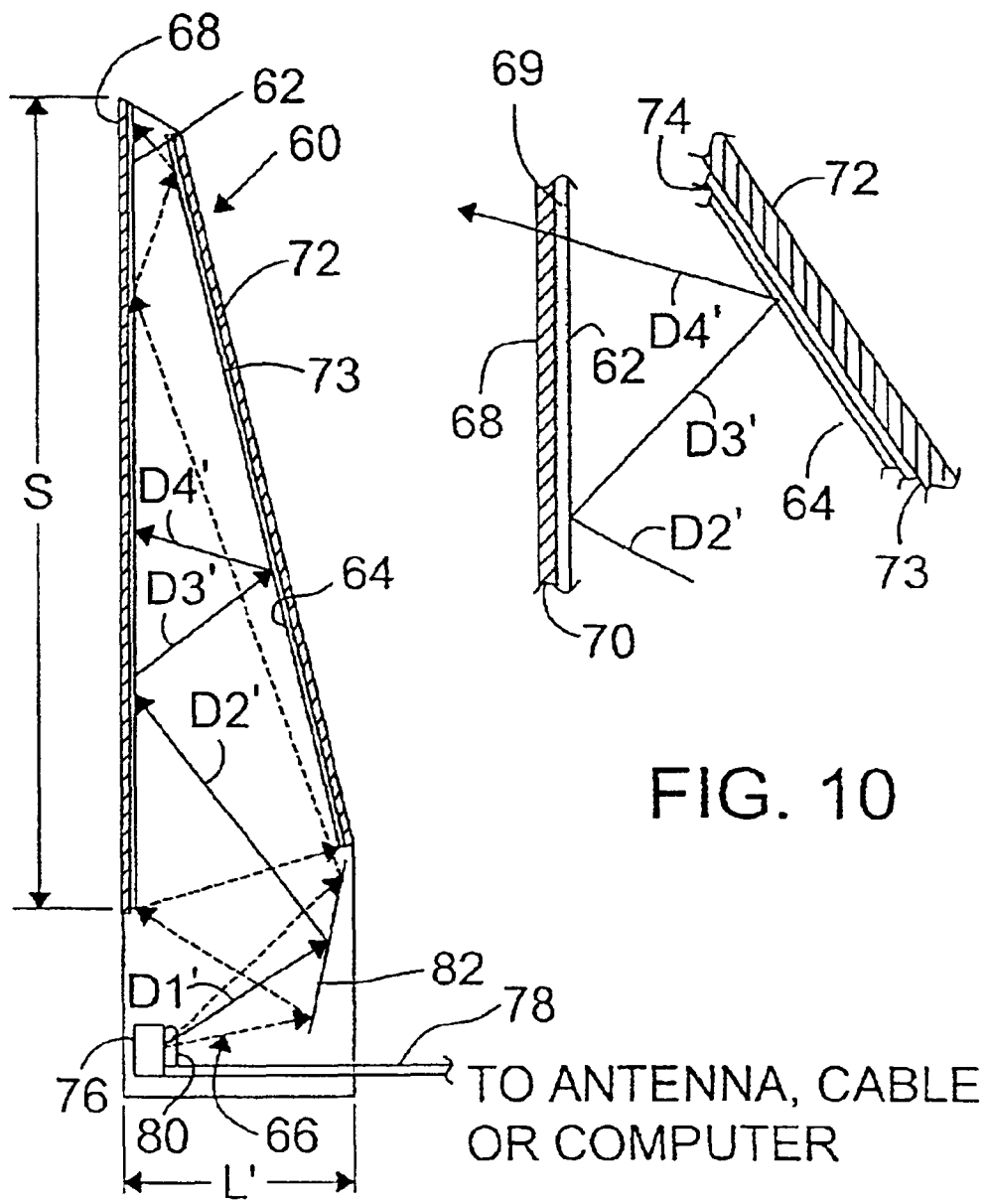
FIGS. 9 and 10 are side views of the preferred embodiment of the apparatus of the present invention showing a rear projection video system.

FIGS. 9 and 10 show a rear projection video system 60 that includes a linear reflecting polarizer 62 and an achromatic retarder 64 that allow light in a projected image 66 to reflect from a display screen 68 at one instance and to pass through the screen 68 at another instance. This allows for "optical folding," which allows the video system 60 to be very shallow yet project a large image, as described in the previously incorporated U.S. patent application entitled "Projecting Images." For the video system 60 to work properly, the image source 76 must produce polarized light. A wide variety of other types of video systems employ polarization in image formation.

Figure 11:
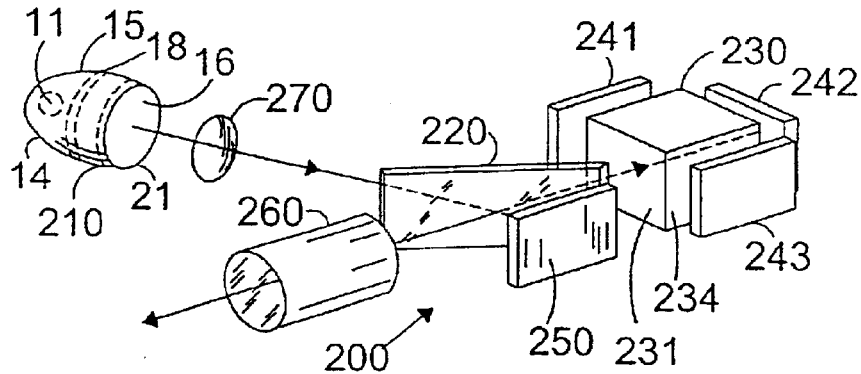
FIG. 11 is a perspective view of the projection display apparatus of an embodiment of the present invention.
Figure 12:
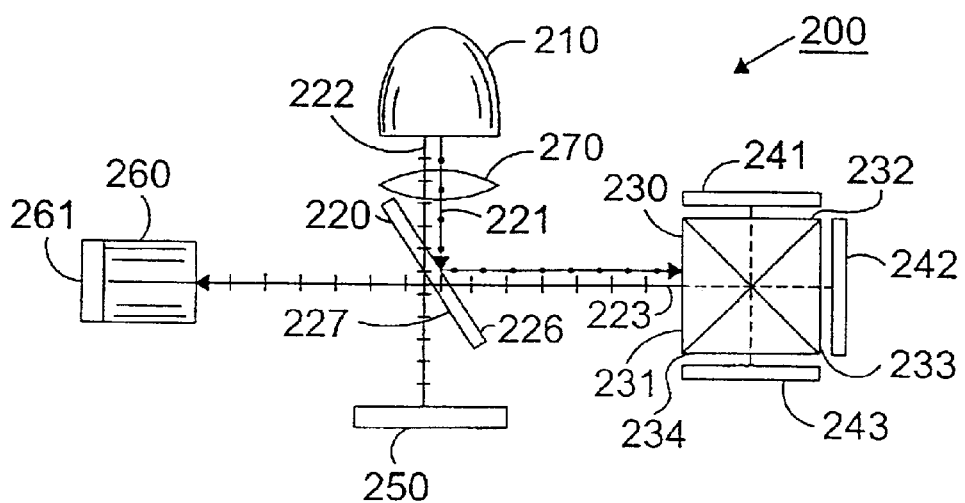
FIG. 12 is a top view of the projection display apparatus of an embodiment of the present invention.

FIGS. 11 and 12 show the projection display apparatus or engine 200 of a first embodiment of the present invention. The projection display apparatus 200 comprises a source 210 of rays of polarized light, such as the light source 10A of FIG. 1, a polarizer/analyzer (reflecting polarizer) 220, an X-cube beam splitter/combiner 230, reflecting polarizing LCDs 241, 242, 243, a mirror 250, a projection lens 260, an optional clean-up polarizing filter 261, and an optional condenser lens 270. The projection display apparatus 200 (or any of the remaining embodiments, which employ a wide angle reflecting polarizer) can advantageously be used as the image source 76 in the video system 60 shown in FIGS. 9 and 10.

Figure 12A:
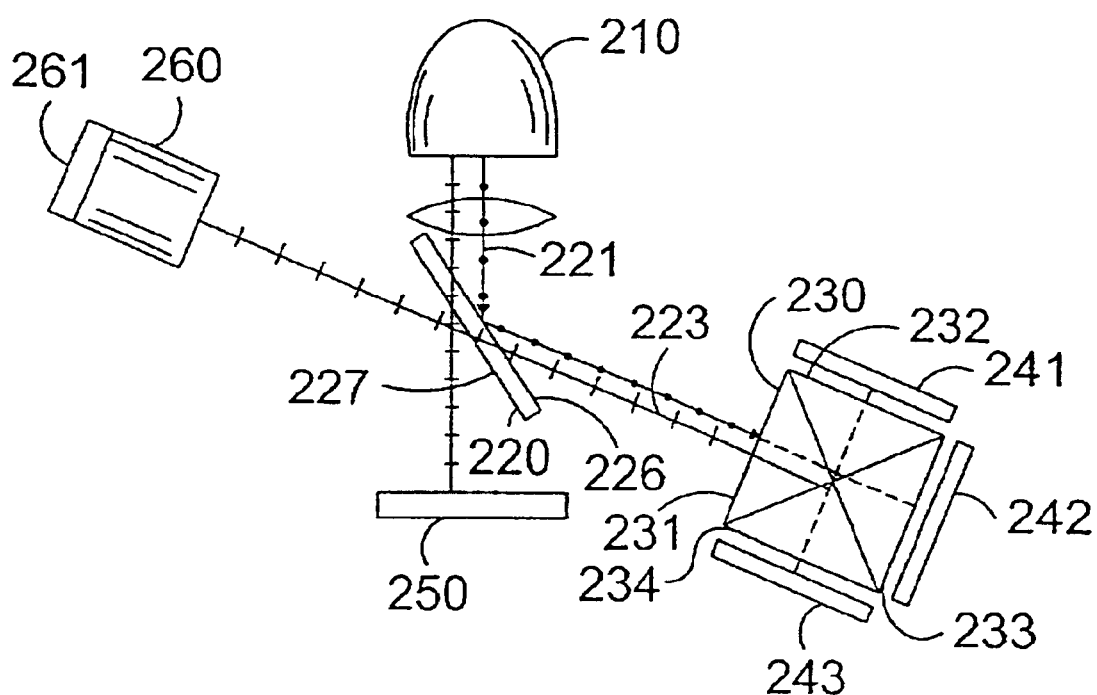
FIG. 12A is a top view of the projection display apparatus of an alternative embodiment of the present invention.

The reflecting polarizer 220 (preferably made of DBEF, or double brightness enhancement film, commercially available from Minnesota Mining & Manufacturing Company, though some other wide angle reflecting polarizer could be used) is preferably aligned at approximately a 45° angle to the rays of polarized light for passing substantially all of the components of light polarized in a first direction (P-polarized in a direction parallel to the plane of incidence) and for reflecting substantially all of the components of light polarized in a second direction (S-polarized, in a direction normal to the plane of incidence). The reflecting polarizer 220 could be set to work at angles other than 45°, with corresponding changes to the remainder of the optics to account for the other angles. FIG. 12A shows an alternative embodiment in which the angle of incidence of the light projected by the source 210 to the reflecting polarizer 220 is other than 45°. When the reflecting polarizer is an appropriate wide angle reflecting polarizer, such as DBEF, angles other than 45° can be chosen.

The X-cube beam splitter/combiner 230 has a first, primary incidence plane 231 aligned at approximately a 45° angle to the reflecting polarizer 220. The purpose of the X-cube beam splitter/combiner 230 is to split the rays of S-polarized light into blue, green, and red light rays and to direct substantially all of a first light color (such as blue light rays) through a second plane of the X-cube beam splitter/combiner 230, to direct substantially all of a second light color (such as green light rays) through a third plane of the X-cube beam splitter/combiner 230, and to direct substantially all jof a third light color (such as red light rays) through a fourth plane of the X-cube beam splitter/combiner 230. While red, green, and blue are shown in this embodiment, any three colors suitable as primary colors could be used.

A first reflecting polarizing LCD 241 receives the blue light rays from X-cube beam splitter/combiner 230. The reflecting polarizing LCD 241 (and the reflecting polarizing LCDs 242 and 243) is preferably a liquid crystal spatial light modulator. These LCDs operate as a type of variably birefringent switch. In a first position, the reflected light is essentially unaffected by the LCD, resulting in the reflective light being S-polarized as was the incident light. When the liquid crystals are fully energized, however, the liquid crystal display effectively retards the incident light by a half wave, resulting in a rotation of the polarity by 90°. Thus, the S-polarized light is reflected as P-polarized light. In between, if appropriate for the particular LCD, components of each are apparent, resulting in elliptically polarized or circularly polarized light, with a greater and lesser degree of polarization in a particular direction according to the amount of voltage applied to that particular pixel of the LCD of the reflecting polarizing LCD 241. For alignment purposes, the optical axis of the liquid crystal display is aligned at a 45° angle relative to the angle of polarization of the incident S-polarized light.

Thus, the reflecting polarizing LCD 241 shifts the polarization of the blue light rays such that the reflected light has varying degrees of S-polarized components and P-polarized components, varying from entirely S-polarized to entirely P-polarized. These rays are directed back into the X-cube beam splitter/combiner 230.

The second reflecting polarizing LCD 242 is used for receiving the green light rays from X-cube beam splitter/combiner 230, and like the first reflecting polarizing LCD 241 shifts the polarization of the S-polarized light so that the result is no, some, or all P-polarized light. The green light rays are then directed back into the X-cube beam splitter/combiner 230. The third reflecting polarizing LCD 243 does the same for the red light rays from the X-cube beam splitter/combiner 230.

In operation, radio-frequency (such as microwave) energy is used to excite the fill in light bulb 11, and light is emitted therefrom. Some of this light (the blue, green, and red components) passes through reflecting filter 18. The rest of the light is reflected by reflecting filter 18 back into light bulb 11.

Of the light which passes from the bulb 11 through the filter 18, substantially all of the transmitted light is S-polarized, while the remaining light is reflected back towards the bulb 11 from the filter 21. A small amount of P-polarized light 222 may escape through filter 21, but it will pass unreflected through reflecting polarizer 220, reflect off of a mirror 250, and back through a second surface 227 of the reflecting polarizer 220 towards the filter 21, through which it will pass. The insulated filter 21 does not normally pass P-polarized light in a first direction when the light is coming from the bulb 11, but normally passes P-polarized light in a second direction when the light is coming from outside of the light source 210. This initially P-polarized light is then directed to the bulb 11 for optical pumping.

It will be appreciated that the mirror 250 is not strictly necessary. This is especially true if the source 210 initially provides light of only the desired polarity. In that case, very little light will actually pass through the reflecting polarizer 220 anyway, so the mirror 250 can be eliminated. Even if the light is not prefiltered in this way, the mirror 250 could be eliminated without detracting from the spirit of the invention.

The S-polarized light 221, after passing through the filter 18 (and a condenser lens 270, if present) reflects off of a first surface 226 of the reflector 220 and into the first, primary incidence plane 231 of the X-cube beam splitter/combiner 230. The X-cube beam splitter/combiner 230 then splits the rays of S-polarized light into blue, green, and red light rays and directs substantially all blue light rays through a second plane 232 of the X-cube beam splitter/combiner 230, directs substantially all green light rays through a third plane 233 of the X-cube beam splitter/combiner 230, and directs substantially all red light rays through a fourth plane 234 of the X-cube beam splitter/combiner 230.

The light is then reflected by the LCDs 241, 242, and 243, as described above. The LCDs 241, 242, 243 are electrically controlled, such as with television signals, signals from a personal computer, or other means discussed in co-pending U.S. patent application entitled "Projecting Images." As discussed above, the reflected light is either totally S-polarized (unchanged), totally P-polarized, or elliptically polarized with components of each.

Both the P-polarized and S-polarized components of the light rays 223 again pass through and out of the X-cube beam splitter/combiner 230. When the light strikes the reflecting polarizer 220, the P-polarity components pass through, while the S-polarity components are reflected. The P-polarized components pass through the projection lens 260 and clean-up polarizing filter 261 (if present) and out of the apparatus 200, providing an image source for, for example, the apparatus 60. The remaining S-polarized components are reflected by the reflecting polarizer 220 and directed back into the light source 210, serving to "optically pump" the bulb 11.

Thus, as one will appreciate from a description of FIGS. 11 and 12, substantially all light emanating from bulb 11 is either transmitted through projecting lens 260 or is reflected back into bulb 11 for re-use (perhaps after sufficient downshifting takes place).

The LCDs 241, 242, 243 currently can be analog LCDs in the sense that the amount of polarization change for a pixel is related to the voltage level applied to that pixel. This allows the intensity of each color to be individually adjusted, providing for multiple colors. Alternatively, the LCDs 241, 242, 243 can be ferroelectric LCDs, where each pixel is instead only on or off, and then one pulse width modulates within each frame and/or performs frame-to-frame modulation to approximate a desired brightness for a color.

Figure 13:
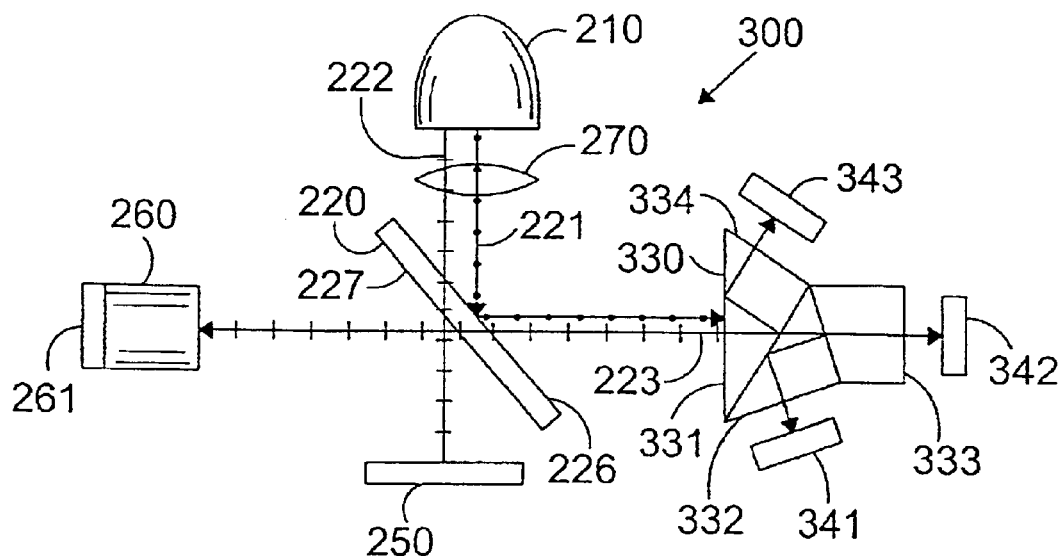
FIG. 13 is a top view of the projection display apparatus of an embodiment of the present invention.

FIG. 13 is a top view of the projection display apparatus 300 of an embodiment of the present invention. The projection display apparatus 300 is essentially the same as the apparatus 200, but X-cube beam splitter/combiner 230 of the apparatus 200 is replaced with a Phillips prism 330, and the reflecting polarizing LCDs 241, 242, 243 are replaced with the reflecting polarizing LCDs 341, 342, 343, respectively. The Phillips prism 330 includes a plane 334 through which red light is transmitted, a plane 333 through which green light is transmitted, and a plane 332 through which blue light is transmitted. The reflecting polarizing LCDs 341, 342, 343 work in the same manner as the reflecting polarizing LCDs 241, 242, 243.

Figure 14:
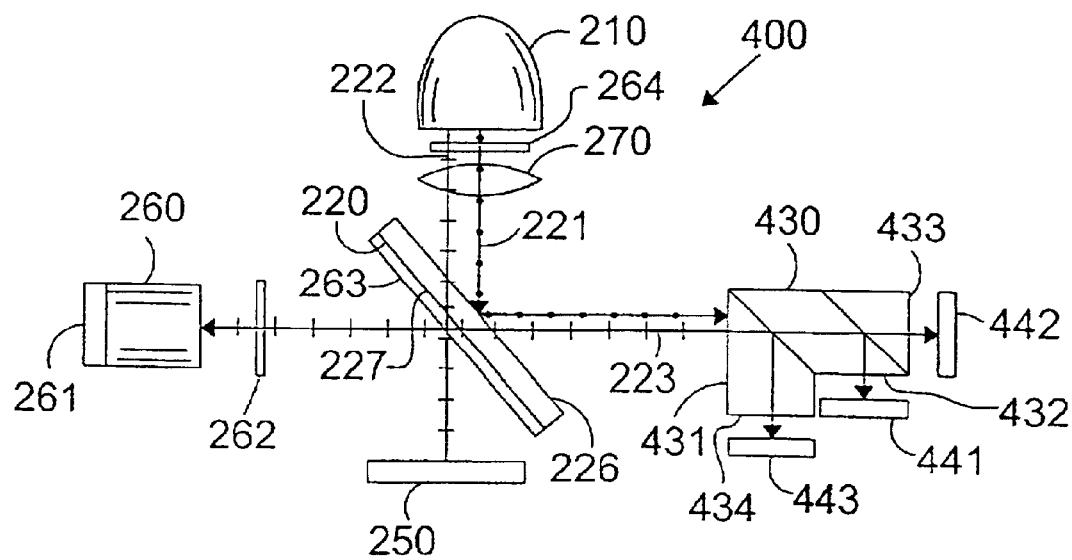
FIG. 14 is a top view of the projection display apparatus of an alternative embodiment of the present invention.

FIG. 14 is a top view of the projection display apparatus 400 of an alternative embodiment of the present invention. The projection display apparatus 400 is essentially the same as the apparatus 200, but X-cube beam splitter/combiner 230 of the apparatus 200 is replaced with a prism 430, the reflecting polarizing LCDs 241, 242, 243 are replaced with the reflecting polarizing LCDs 441, 442, 443, respectively, and a number of optional polarizing filters are included in the apparatus 400.

The optional polarizing filters shown in FIG. 14 include the clean-up polarizing filter 261, a pre-polarizer 264 immediately downstream of the lamp 210 to provide clean-up polarization, an absorptive polarizer 263 laminated to the polarizer/analyzer 220, and/or an absorptive polarizer 262 between polarizer/analyzer 220 and lens 260 for clean-up. Any or all of the filters 261, 262, 263, and 264 could be omitted, or all could be included, in apparatus 400; likewise, any or all of these filters could be included in the apparatus of other embodiments of the present invention described herein.

The prism 430 includes a plane 434 through which red light is transmitted, a plane 433 through which green light is transmitted, and a plane 432 through which blue light is transmitted. The reflecting polarizing LCDs 441, 442, 443 work in the same manner as the reflecting polarizing LCDs 241, 242, 243.

Figure 14A:
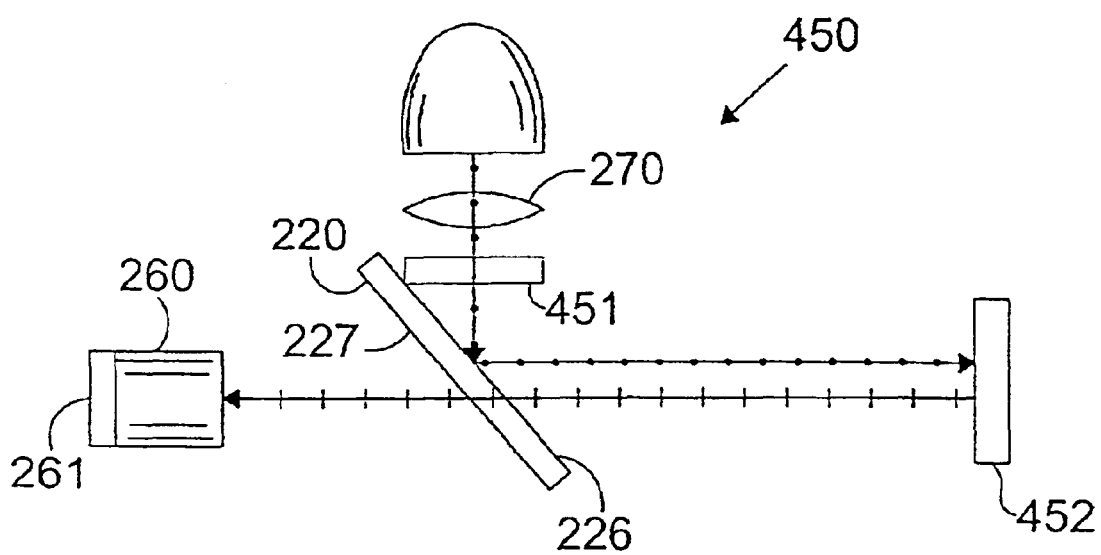
FIG. 14A is a top view of an embodiment of the present invention that uses sequential color.

FIG. 14A is a top view of the projection display apparatus 450 of another embodiment of the present invention. The projection display apparatus 450 is similar to the apparatus 200 but only a single reflecting/polarizing LCD 452 is used and no bean splitter/combine is utilized. A color wheel or shutter 451 is provided prior to the polarizer/analyzer 220. The color wheel 451 acts to provide time-sequential red, green, and blue light, so that the projection display apparatus 450 is a color sequential system. The reflecting/polarizing LCD 452 then receives red, green and blue data during the appropriate period in synchronization with the color wheel 451. The viewer's eye then integrates the three separate images into a single multicolor image.

Figure 15:
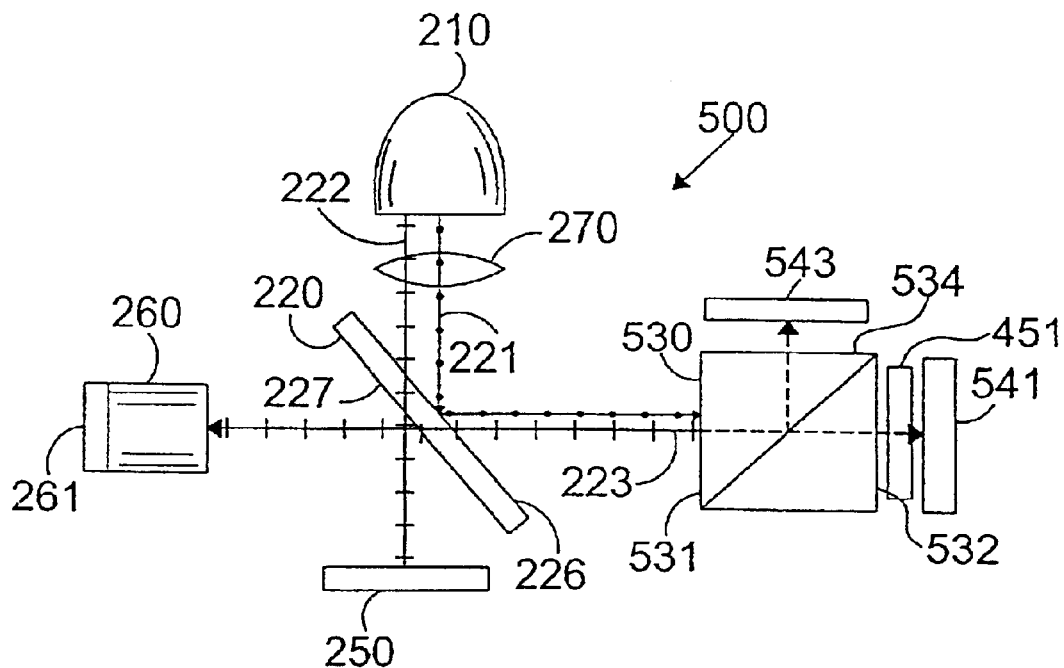
FIG. 15 is a top view of the projection display apparatus of another embodiment of the present invention.

FIG. 15 is a top view of the projection display apparatus 500 of another embodiment of the present invention. The projection display apparatus 500 is similar to the apparatus 200, but X-cube beam splitter/combiner 230 of the apparatus 200 is replaced with a prism 530, and the reflecting polarizing LCDs 241 and 243 are replaced with the reflecting polarizing LCDs 541 and 543, respectively. The reflecting polarizing LCD 242 is omitted.

The prism 530 includes a plane 534 through which a single color light, for example, red, is transmitted and a plane 532 through which two colors of light, blue and green for example, are transmitted. The reflecting polarizing LCDs 541 and 543 work in the same manner as the reflecting polarizing LCDs 241 and 243. Reflecting polarizing LCD 541 operates like reflective polarized LCD 452 of FIG. 14A, except that sequential modulation is done of only two colors.

Figure 16:
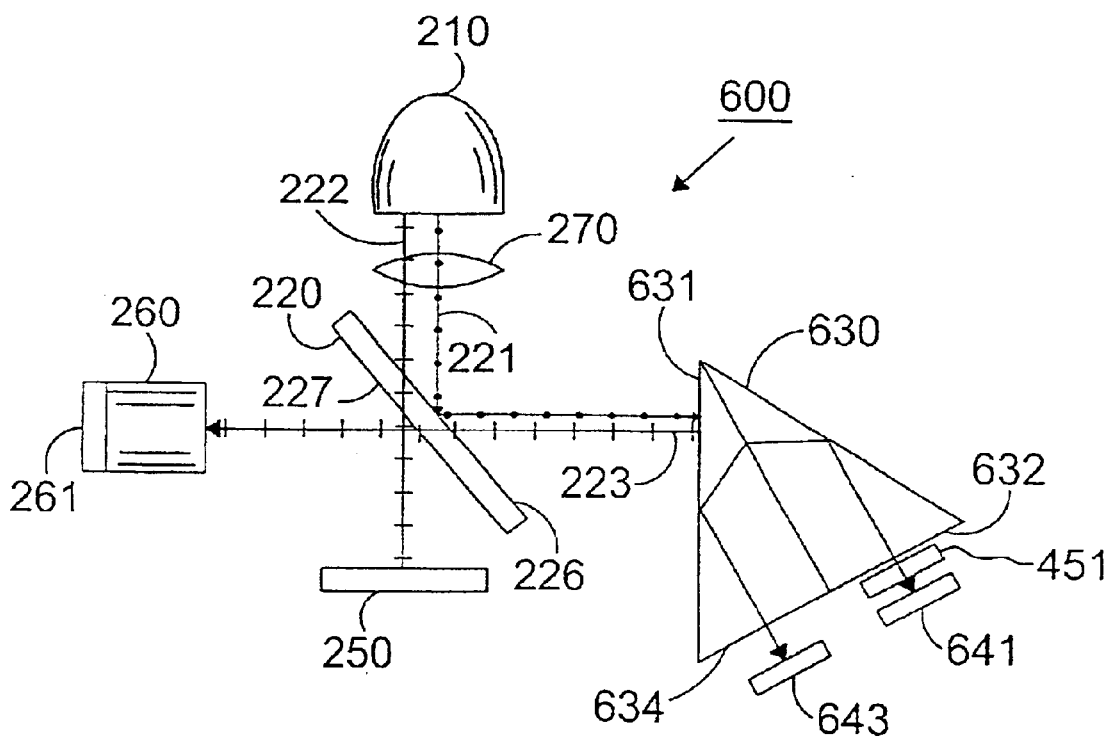
FIG. 16 is a top view of the projection display apparatus of another alternative embodiment of the present invention.

FIG. 16 is a top view of the projection display apparatus 600 of another alternative embodiment of the present invention. The projection display apparatus 600 is similar to the apparatus 500, but the prism 530 of the apparatus 500 is replaced with a prism 630, and the reflecting polarizing LCDs 541 and 543 are replaced with the reflecting polarizing LCDs 641 and 643, respectively.

The prism 630 includes a planar surface 634 through which a first color of light is transmitted and a planar surface 632 through which two other colors of light are transmitted. The reflecting polarizing LCDs 641 and 643 work in the same manner as the reflecting polarizing LCDs 541 and 543.

Figure 17:
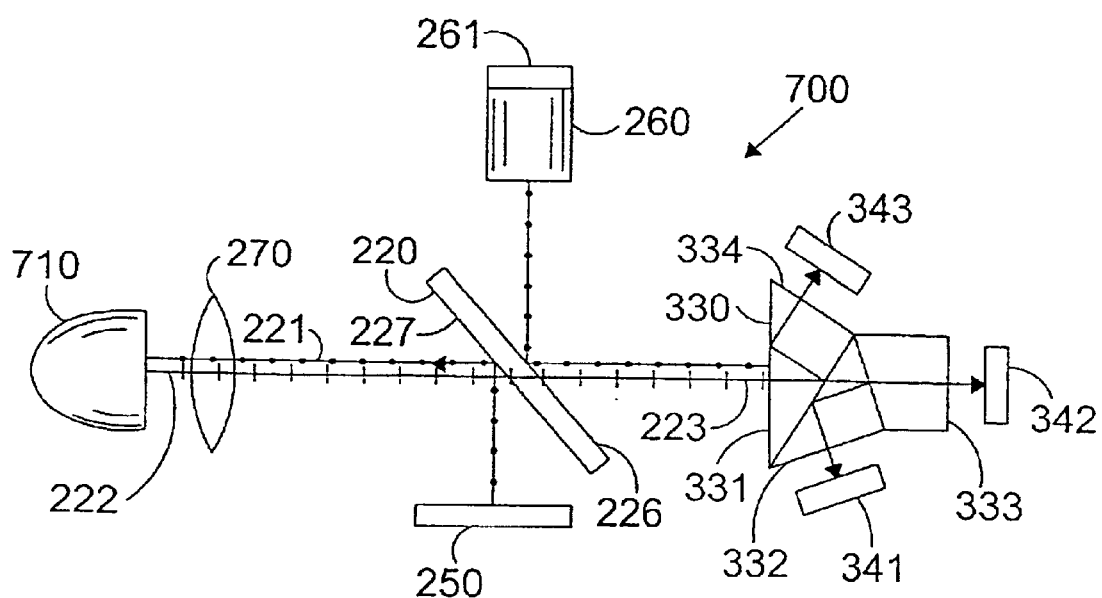
FIG. 17 is a top view of the projection display apparatus of yet another alternative embodiment of the present invention.

FIG. 17 is a top view of the projection display apparatus of yet another alternative embodiment of the present invention, projection display apparatus 700. The projection display apparatus 700 is perhaps most similar to the projection display apparatus 300, but works on a reflective, rather than transmissive, principle. In apparatus 700, the light source 210 is replaced with a light source 710, and the light source 710 primarily produces P-polarized light 222 and only incidentally produces S-polarized light 221. In the apparatus 700, the positions of the light source 710 and the lens 260 are switched; mirror 250 still reflects light of an undesired polarity back into the light source 710, but in this case the undesired polarity is S-polarized light. The reflecting polarizing LCDs 341, 342, 343 work in the same manner as in the apparatus 300, changing the polarity of so much of the light as is desired to be transmitted to lens 260.

Apparatus 200, 400, 450, 500, and 600 could all be modified to reflect from polarizer/analyzer 220 rather than transmit through polarizer/analyzer 220 an image into lens 260.

For monochrome applications, one could modify the projection display apparatus 200 to omit the beam splitter/combiner 230 and LCDs 241 and 243. Alternatively, if one wished to use a reflective principle with a monochrome application, one could use the apparatus 700 but omit the prism 330 and the LCDs 341 and 343.

The projection display apparatus 200, 300, 400, 450, 500, 600, and 700 is advantageous over systems such as those shown in U.S. Pat. No. 5,453,859 in part because a wide angle reflecting polarizer (such as 3M DBEF) is used as the reflecting polarizer 220. Further, the filters 21 and 18 and the mirror 250, if used, cause a substantial portion of the light to be redirected into lamp 11 for absorption and re-emission. Additionally, any light reflected from an "off" pixel in the reflecting, polarizing LCDs is reflected back to the lamp 11 by the action of the LCD and the polarizer/analyzer 220 as the "off" pixel light has not been retarded by the LCD, so the polarization is such that the light is reflected by the polarizer/analyzer 220 back to the lamp 11. Thus, efficiency is increased at a system level due to these types of reflected light.

As used herein, "wide angle reflecting polarizer" means a reflecting polarizer that substantially transmits light of one polarization and reflects light of another through a wide variation in angles. Typical reflecting polarizers only operate properly at an angle very close to the Brewster angle. Wide angle refection polarizers operate at a variety of angles.

It will also be appreciated that a variety of other optical components can be included in the embodiments disclosed in FIGS. 11–17. For example, the light out of the source 210 could be immediately polarized, with the needed polarity of light reflected into the source. This could occur, for example, between the lens 270 and the source 210. Further, the lens 270 could be placed at different points in the optical path without detracting from the spirit of the invention. Also, although a variety of devices are shown for creating the polarized image, the specific device is not critical. A wide variety of image engines which create a polarized image could be used with the wide angle reflecting polarizer in a system according to the invention. For example, instead of providing three LCDs 241, 242, and 243 as shown in FIG. 12, a color sequential system using a single LCD could be used. By using a wide angle reflecting polarizer in a system that utilizes polarization to create images, the tolerances are relaxed and the system becomes easier to construct and maintain.

The foregoing embodiments are presented by way of example only; the scope of the present invention is to be limited only by the following claims.

What is claimed is:

1. A projection display apparatus comprising:
   a light source adapted to provide a light beam;
   a wide angle reflecting polarizer adapted to pass substantially all light of a first polarization component of the light beam, and to reflect substantially all light of a second polarization component of the light beam;
   a reflective surface positioned to reflect one of the first or second polarization components back towards the wide angle reflecting polarizer;

an image engine adapted to receive one of the first or second polarization components not reflected by the reflective surface and to return to said wide angle reflecting polarizer a polarized image in which polarization of the received polarization component is shifted corresponding to an image to display to include portions of the second or first polarization components.

2. The apparatus of claim 1, wherein the wide angle reflecting polarizer is configured to pass substantially all of the first polarization component of the light beam to the image engine, and the reflective surface is configured to return substantially all of the second polarization component of the light beam via the wide angle reflecting polarizer to the light source for energy recovery.

3. The apparatus of claim 1, wherein the image engine further comprises:
 a prism configured to split polarized light received from the reflecting polarizer into first and second color bands;
 a first liquid crystal display (LCD) positioned to receive the first color band, and adapted to operate in a color sequential mode; and
 a second LCD positioned to receive the second color band.

4. The apparatus of claim 1, wherein the wide angle reflecting polarizer comprises a double brightness enhancement film.

5. The apparatus of claim 1, wherein the image engine further comprises:
 a beam splitter/combiner for splitting polarized light received from the reflecting polarizer into a plurality of color bands, wherein the beam splitter/combiner comprises a plurality of planar surfaces;
 a respective reflecting polarizing liquid crystal display (LCD) associated with each of the plurality of color bands;
 wherein the beam splitter/combiner and the respective reflecting polarizing LCDs are optically coupled such that each color band is directed through a respective planar surface of the beam splitter/combiner to a respective reflecting polarizing LCD, and reflected back to the beam splitter/combiner by the respective reflective polarizing LCD for recombining.

6. The apparatus of claim 5, wherein the LCD is an analog LCD.

7. The apparatus of claim 1, wherein the reflective surface comprises a mirror positioned on an opposite side of the wide angle reflecting polarizer with respect to the light source.

8. The apparatus of claim 1, further comprising means for modifying the direction of the rays of light.

9. The apparatus of claim 1, further comprising:
 a projection apparatus configured to produce an image display on a display surface, the projection apparatus including:
  a display surface;
  an optical device; and
  a transmitter configured to transmit light from the image engine to the display surface such that the light travels an image path which reaches the optical device twice on its way to the display surface, in order to reflect light from a display screen at one instance, and in order to pass through the display screen at another instance, wherein the optical device is configured to reflect some light and transmit other light, and the display surface is substantially coextensive with the optical device.

10. The apparatus of claim 1, wherein the image engine receives the first polarization component passed through said wide angle reflecting polarizer.

11. The apparatus of claim 1, wherein the image engine receives the second polarization component reflected from said wide angle reflecting polarizer.

12. The apparatus of claim 1, wherein the beam of light is directed by the light source to the wide angle reflecting polarizer at an angle substantially 45° from a surface formed by the reflecting polarizer.

13. The apparatus of claim 1, wherein the beam of light is directed by the light source to the wide angle reflecting polarizer at an angle other than 45° from a surface formed by the wide angle reflecting polarizer.

14. The apparatus of claim 1, wherein the image engine further comprises a color wheel/shutter and an LCD, the color wheel/shutter positioned between the light source and the LCD for color sequential operation, wherein the LCD is adapted to generate a polarized image and to control a brightness of the polarized image.

15. The apparatus of claim 1, wherein the image engine further comprises:
 a beam splitter/combiner configured to split polarized light received from the reflecting polarizer into first and second color bands;
 a first liquid crystal display (LCD) positioned to receive the first color band and adapted to operate in a color sequential mode; and
 a second LCD positioned to receive the second color band.

16. The apparatus of claim 15, further comprising a color wheel/shutter positioned between the beam splitter/combiner and the first LCD.

17. The apparatus of claim 1, wherein all the light having the second polarization component reflected by the wide angle reflecting polarizer is reflected from a common surface of the wide angle reflecting polarizer.

18. The apparatus of claim 1, wherein all the light having the second polarization component reflected by the wide angle reflecting polarizer is reflected onto a common optical path.

19. A method of producing a visual image comprising:
 providing a light source configured to provide a beam of light;
 directing the light onto a wide angle reflecting polarizer for passing substantially all of a first polarization component of the beam, and for reflecting substantially all of a second polarization component of the beam;
 reflecting one of the first or second polarization component back to the light source via the wide angle reflecting polarizer;
 receiving, in an image engine, one of the first or second polarization components not reflected back to the light source;
 shifting the polarity of the polarization component received by the image engine in accordance with an image to be displayed to include portions of the second or first polarization components to yield a polarized image; and
 directing the polarized image to the wide angle reflecting polarizer.

20. The method of claim 19, wherein the wide angle reflecting polarizer comprises a double brightness enhancement film.

21. The method of claim 19, wherein the reflective surface comprises a mirror positioned on an opposite side of the wide angle reflecting polarizer with respect to the light source.

22. The method of claim 19, wherein the image engine comprises a spatial light modulator.

23. The method of claim 19, further comprising modifying the direction of rays of light.

24. The method of claim 19, further comprising providing a projection apparatus for producing an image display on a display surface, the projection apparatus comprising:
- a display surface;
- an optical device; and
- a transmitter configured to transmit light from the image engine to the display surface such that the light travels an image path which reaches the optical device twice on its way to the display surface, for reflecting light from a display screen at one instance, and for passing through the display screen at another instance, wherein the optical device is configured to reflect some light and transmit other light, and the display surface is substantially coextensive with the optical device.

25. A projection system comprising:
- a source of polarized light;
- a wide angle reflecting polarizer aligned at an angle to propagation direction of the polarized light in order to pass substantially all light which is polarized in a first direction and reflect substantially all light which is polarized in a second direction, and configured to return back to the light source polarized light which is reflected back to the wide angle reflecting polarizer from a reflective surface for energy recovery;
- a beam splitter/combiner, having a first primary incidence plane aligned at an angle to the wide angle reflecting polarizer, configured to split incident polarized light from the reflecting polarizer into first, second, and third colors;
- a first reflecting polarizing LCD configured to receive the first color from the beam splitter/combiner, shift the polarization of none, some or all of the first color, and direct the first color back into the beam splitter/combiner;
- a second reflecting polarizing LCD configured to receive the second color from the beam splitter/combiner, shift the polarization of none, some, or all of the second color, and direct the second color back into the beam splitter/combiner;
- a third reflecting polarizing LCD configured to receive the third color from beam splitter/combiner, shift the polarization of none, some, or all of the third color, and direct the third color back into the beam splitter/combiner;
- a lens configured to receive and transmit substantially all of the polarized light whose polarity has been shifted and which have passed from the beam splitter/combiner to the wide angle reflecting polarizer; and
- a display surface configured to receive light from the lens.

26. The apparatus of claim 25, wherein the wide angle reflecting polarizer comprises a double brightness enhancement film.

27. The apparatus of claim 25, wherein the first, second, and third colors are respectively red, green, and blue.

28. A projection display engine apparatus that receives a beam of light from a light source, comprising:
- a wide angle reflecting polarizer configured to pass substantially all of a first polarized portion of the beam that is polarized in a first direction, and to reflect substantially all of a second polarized portion of the beam that is polarized in a second direction;
- a reflective surface configured to reflect one of the first and second polarized portions back to the light source via the wide angle reflecting polarizer for energy recovery; and
- an image engine configured to receive one of the first or second polarized portions not reflected by the reflective surface and return to said wide angle reflecting polarizer a polarized image in which the polarization of the received polarized portion is shifted corresponding to an image to display, to include components of the second or first polarized portions.

29. The apparatus of claim 28, wherein the image engine further comprises:
- a prism configured to polarized light received from the reflecting polarizer into first and second color bands;
- a first liquid crystal display (LCD) positioned to receive the first color band, and adapted to operate in a color sequential mode; and
- a second LCD positioned to receive the second color band.

30. The apparatus of claim 28, wherein the wide angle reflecting polarizer comprises a double brightness enhancement film.

31. The apparatus of claim 28, wherein the reflective surface comprises a mirror positioned on an opposite side of the wide angle reflecting polarizer with respect to the light source.

32. The apparatus of claim 28, wherein the image engine further comprises:
- a beam splitter/combiner for splitting polarized light received from the reflecting polarizer into a plurality of color bands, wherein the beam splitter/combiner comprises a plurality of planar surfaces;
- a respective reflecting polarizing liquid crystal display (LCD) associated with each of the plurality of color bands;
- wherein the beam splitter/combiner and the respective reflecting polarizing LCDs are optically coupled such that each color band is directed through a respective planar surface of the beam splitter/combiner to a respective reflecting polarizing LCD, and reflected back to the beam splitter/combiner by the respective reflective polarizing LCD for recombining.

33. The apparatus of claim 32, wherein the LCD is an analog LCD.

34. The apparatus of claim 28, further comprising means for modifying the direction of the rays of light.

35. The apparatus of claim 28, further comprising:
- a projection apparatus configured to produce an image display on a display surface, the projection apparatus comprising:
  - a display surface;
  - an optical device; and
  - a transmitter configured to transmit light from the image engine to the display surface such that the light travels an image path which reaches the optical device twice on its way to the display surface, for reflecting light from a display screen at one instance, and for passing through the display screen at another instance, wherein the optical device is reflective of some light and transmissive of other light, and the display surface is substantially coextensive with the optical device.

36. The apparatus of claim 28, wherein the image engine receives the first polarized portion passed through said wide angle reflecting polarizer.

37. The apparatus of claim 28, wherein the image engine receives the second polarized portion passed through said wide angle reflecting polarizer.

38. The apparatus of claim 28, wherein the beam of light is directed from the light source to the wide angle reflecting polarizer at an angle substantially 45° from a surface formed by the reflecting polarizer.

39. The apparatus of claim 28, wherein the beam of light is directed from the light source to the wide angle reflecting polarizer at an angle other than 45° from a surface formed by the reflecting polarizer.

40. The apparatus of claim 28, wherein the image engine further comprises:

a beam splitter/combiner configured to split polarized light received from the reflecting polarizer into first and second color bands;

a first liquid crystal display (LCD) positioned to receive the first color band and adapted to operate in a color sequential mode; and a second LCD positioned to receive the second color band.

* * * * *